June 26, 1934. C. H. KINDL ET AL Re. 19,224

SHOCK ABSORBER

Original Filed March 14, 1931 2 Sheets-Sheet 1

Inventors
Carl H. Kindl
and Frederick D. Tenotro

By
Lemon, Hardman and Peter
Attorneys

June 26, 1934. C. H. KINDL ET AL Re. 19,224

SHOCK ABSORBER

Original Filed March 14, 1931 2 Sheets-Sheet 2

Inventors
Carl H. Kindl
and Frederick D. Firestone
By Spencer, Hardman and Fehr
Attorneys Reissued June 26, 1934

Re. 19,224

UNITED STATES PATENT OFFICE 19,224

SHOCK ABSORBER

Carl H. Kindl and Frederick D. Funston, Dayton, Ohio, assignors, by mesne assignments, to General Motors Corporation, Detroit, Mich., a corporation of Delaware Original No. 1,873,133, dated August 23, 1932, Serial No. 522,568, March 14, 1931. Application for reissue February 11, 1933, Serial No. 656,390

17 Claims. (Cl. 188—88)

This invention relates to improvements in double-acting hydraulic shock absorbers.

In the operation of motor vehicles it has been found that while the vehicle is being operated over a comparatively smooth highway or boulevard the vehicle springs, if properly designed, are capable of cushioning and dissipating road shocks and thereby preventing the body from having uncomfortable jars or jolts transmitted thereto. However, when the vehicle is operated over comparatively rough highways, such springs are incapable of dissipating the jars and jolts and therefore vehicles have been provided with shock absorbers adapted to restrain the movement of the vehicle axles and body.

It has been found that shock absorbers designed to control vehicle spring action on the rougher highways are substantially too severe in their control while the vehicle is being operated over a comparatively smoother highway or boulevard, the shock absorber practically acting as an unyieldable tie betwen the axles and vehicle frame and thereby causing to be transmitted to the vehicle frame or body all the jars and jolts resulting from the striking of the smaller obstructions in the roadway.

It is among the objects of the present invention to provide a double-acting shock absorber which is adapted to control the actions of the vehicle springs and body in accordance with the conditions of the roadway over which the vehicle is being operated.

A further object of the present invention is to provide a shock absorber so constructed and arranged that, it will be substantially ineffective to control spring actions while the vehicle is being operated over a comparatively smooth road or boulevard, said shock absorber, however, being automatically adjustable to restrain spring and body movements resulting from the operation of the vehicle over a comparatively rougher highway.

A further object of the present invention is to control a shock absorber in accordance with body oscillations.

Further objects and advantages of the present invention will be apparent from the following description, reference being had to the accompanying drawings, wherein a preferred embodiment of one form of the present invention is clearly shown.

Figure 1:
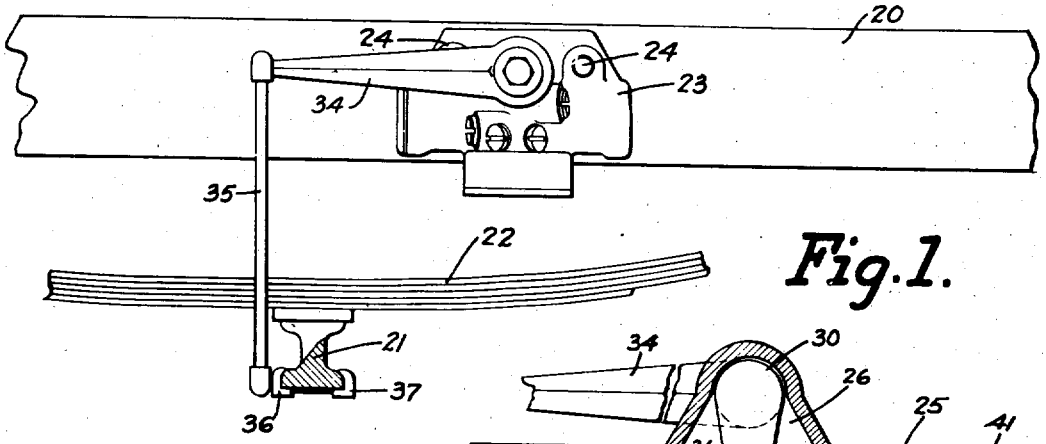
Fig. 1 is a fragmentary view of a vehicle frame and axle with a shock absorber embodying the present invention attached thereto.
Figure 4:
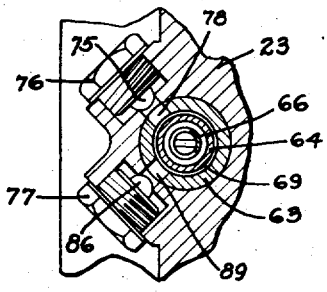
Fig. 4 is a fragmentary sectional view taken substantially along the line 4—4 of Fig. 3

Referring to the drawings, the numeral 20 designates the frame of the vehicle which is supported upon axles, one of which is shown and designated by the numeral 21. The springs 22 support the frame upon said axles.

The shock absorber comprises a casing 23 attached to the frame 20 by bolts or studs 24. The casing 23 provides a cylindrical portion 25 and a fluid reservoir 26. A piston 27 is oscillatably supported within the cylinder 25, said piston comprising two spaced piston head portions 28 and 29, the piston head portion 28 carrying a wear piece 33, while piston head portion 29 carries a wear-piece 32. A rock shaft 30 is supported in proper bearings in the casing 23 and has an arm 31 within the casing, said arm extending between the wearpieces 32 and 33 of the piston head portions and engaging said pieces as shown in the Fig. 2. A part of shaft 30 extends outside the casing and has the shock absorber operating arm 34 attached thereto. This arm 34 has its free end swivelly secured to one end of a link 35, the other end of said link being attached to the axle 21 by clamping members 36 and 37.

The piston head portion 29 forms the spring compression control chamber 40 at one end of the cylinder 25, while the piston head portion 28 forms the spring rebound control chamber 41.

Each piston head portion is provided with a fluid replenishing or intake valve which is adapted to permit fluid to flow from the reservoir into the respective compression chamber, to replenish fluid supply lost through leaks. Inasmuch as the intake valves of the piston heads are exactly alike, only one of them will be described detailedly.

The piston head portion has a longitudinal passage 53, into one end of which extends the recessed shank portion of the wearpiece of said piston head portion. The opposite end of the passage 53 is interiorly threaded to receive the valve-cage 54. This valve-cage provides a valve seat 55 against which the ball check valve 56 is yieldably urged by a spring 57 attached to the valve-cage in any suitable manner. A comparatively stiff spring 57*a* is interposed between the valve-cage 54 and the end of the shank portion of the associate wearpiece, whereby said wearpiece is urged into constant engagement with the free end of the lever 31. An opening in the wall of the shank portion of the wearpiece coincides with a passage 59 in the piston head portion whereby the chamber between the wearpiece and the valve 56 is in communication with the fluid reservoir 26, whereby fluid may flow from said reservoir through the passage 59 into the chamber containing spring 57*a*, and, after urging valve 56 from its seat, passes through the valve-cage into the chamber 40 while the piston is being moved toward the opposite end of the cylinder. The valve of piston head portion 28 functions in a like manner when the piston 27 is moving to increase the cubical content of the spring rebound control chamber 41.

A duct 43 leads from the spring compression control chamber 40 and terminates in a valve chamber 45. A similar duct 44 leads from the spring rebound control chamber and terminates in the valve chamber 46. Duct 43 communicates also with the valve chamber 46 through transverse passage 47, while duct 44 communicates with valve chamber 45 through transverse passage 48. In the valve chamber 45 there is provided a valve 49, termed the fluid pressure release valve, which is maintained in engagement with its seat by the spring 50 whereby communication between ducts 43 and 44 via chamber 45 is normally closed. A similar valve 51 is maintained upon its seat in the valve chamber 46 by a spring 52 normally cutting off communication between ducts 44 and 43 via the transverse passage 47.

The portion of the shock absorber just described is of the usual type, which is not automatically adjustable to compensate for road conditions.

The following described apparatus forms the feature of the present invention and, when applied to the structure described heretofore renders said device automatically adjustable to compensate for road conditions.

Figure 2:
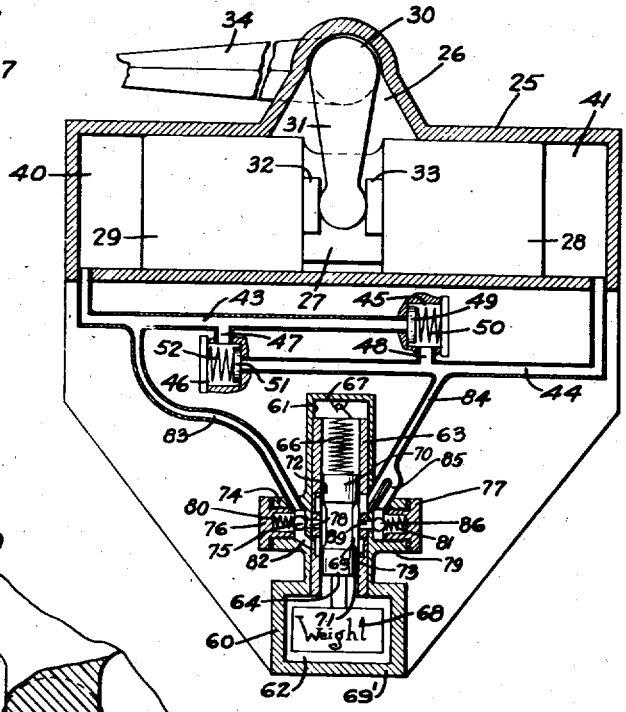
Fig. 2 is a diagrammatic view, in section, showing the various elements of the shock absorber and the fluid flow connections betwen them.
Figure 3:
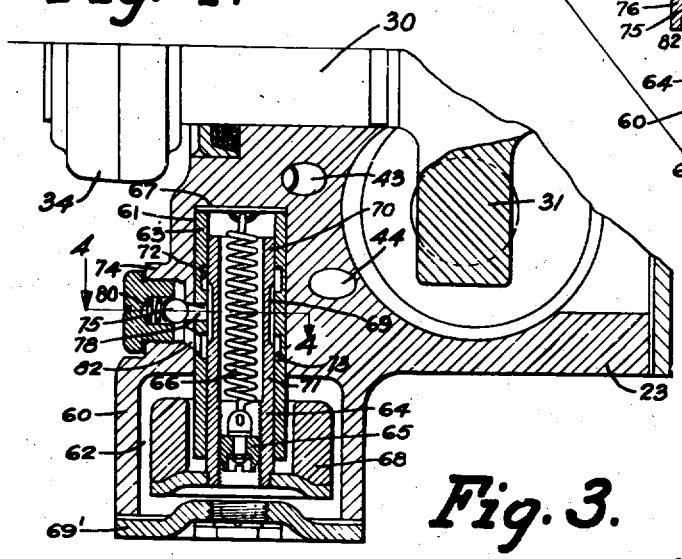
Fig. 3 is an enlarged, fragmentary sectional view illustrating the inertia weight controlled valve.

This apparatus comprises a housing 60, preferably formed integral with the casing 23. Housing 60 provides two chambers, preferably cylindrical, the one designated by the numeral 61, which is of lesser diameter than the other chamber 62. Within the chamber 61 there is provided a sleeve member 63, which acts as a valve-seat, said sleeve member extending from the chamber 61 into the chamber 62 and being immovable relative to the housing. Spaced, interior annular grooves 72 and 73 are provided in the sleeve member 63 as shown in Figs. 2 and 3.

Figure 5:
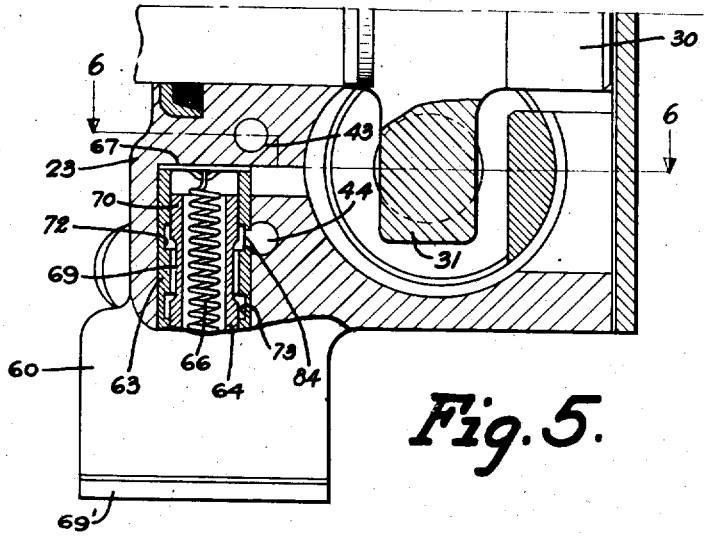
Fig. 5 is a fragmentary sectional view taken substantially along the line 5—5 of Fig. 6.
Figure 6:
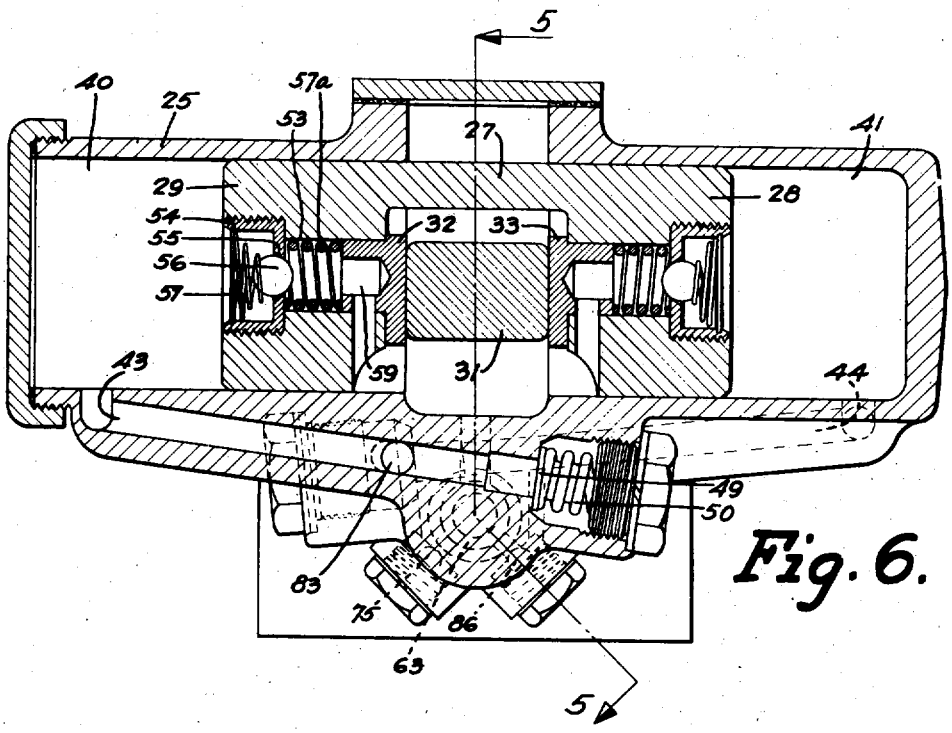
Fig. 6 is a longitudinal sectional view taken along the line 6—6 of Fig. 5.

A valve 64 is slidably supported within the sleeve member 63. This valve is preferably tubular, a portion of the interior surface thereof being screw-threaded and adjustably carrying a plug 65 which provides an anchoring means for one end of the spring 66. The other end of the spring is anchored in any suitable manner to the upper end 67 or ceiling of the housing chamber 61. Valve 64 is therefore yieldably suspended within the valve sleeve 63 by spring 66. The valve has an annular groove 69 in its outer surface so positioned on the valve that, in its normal suspended position the groove 69 of the valve will have its ends communicating respectively with the spaced annular grooves 72 and 73 of the valve sleeve as shown in Figs. 2, 3 and 5. From this it may be seen that the annular groove 69 in the valve 64 forms an annular space within the valve-sleeve 63 between the portions 70 and 71 of the valve, which portions slidably engage the valve sleeve 63, this space, formed by the annular groove 69, normally communicating with both grooves 72 and 73.

The housing 60 has two transverse cylindrical extensions 74 and 79, interiorly threaded to receive screw plugs 76 and 77 respectively. The shank portions of these screw plugs 76 and 77 are recessed, forming valve chambers. The valve chamber formed by extension 74 is in communication with the space formed within the valve sleeve 63 by the annular groove 69 of the valve, through a passage 78 which is formed by aligned holes in the housing 60 and sleeve 63. A similar passage 89 formed by aligned holes in sleeve 63 and housing 60 provides communication with the said space within the sleeve 63 and the valve chamber provided by the annular extension 79. A ball check-valve 75 is yieldably urged by spring 80 to close passage 78 so that communication between the valve-chamber containing said valve 75 and the interior of the sleeve 63 is normally shut off. A similar valve 86, under the influence of spring 81, shuts off communication between the interior of the sleeve 63 and the chamber containing the valve 86.

A duct or passage 83 connects duct 43 with the chamber containing valve 75. This chamber is also in communication with the annular groove 73 of the valve-sleeve 63, through a duct 82 provided by aligned holes in the housing end sleeve 60 and 63 respectively. A passage 84 connects duct 44 with the annular groove 72 of the valve-sleeve 63. This passage 84 has a branch passage 85 which leads into the chamber containing valve 86.

Chamber 62 houses the inertia weight element 68 which is attached to the valve 64 in any suitable manner. The spring 66 is so designed that the weight 68 is suspended substantially midway between the top wall of the chamber 62 and the bottom cover plate 69 of the housing portion forming chamber 62, when the valve 64 is in normal position as shown in Figs. 2 and 3.

From the aforegoing detailed description of the construction of applicants device it may clearly be seen that each compression chamber 40 and 41 has a fluid outlet duct 43 and 44 respectively, the fluid flow through which is controlled by a pressure operated means and by an inertia mass controlled means. The compression chamber 40 has duct 43 leading therefrom the fluid flow through which is regulated by the normally closed pressure release valve 49 and by the inertia mass controlled valve 64 which is normally open. On the other hand chamber 41 has a duct 44 leading therefrom, the fluid flow through which is controlled by the normally closed pressure release valve 51 and the said valve 64. Valve 64 controls the shunt flow of fluid around both pressure release valves 49 and 51, and when closed in response to accelerations in the velocity of movements of the shock absorber casing vertically, provides for the full fluid pressure from either chamber 40 or 41 being directed against the respective valves 49 and 51. Thus said valves 49 and 51 are effective, when valve 64 is open, to direct fluid flow through said valve, and when valve 64 is closed, these valves 49 and 51 are effective to establish restricted flows of fluid through their respective ducts 43 and 44.

The operation of the shock absorber will now be described. While the vehicle is being operated over comparatively smooth highways or boulevards, action of the vehicle springs and oscillations of the body carrying frame 20 are substantially slight and, as has been mentioned heretofore, the vehicle springs 22 will cushion or absorb shocks resulting from the striking of slight obstructions, thereby substantially preventing uncomfortable jars and shocks from being transmitted to the body carrying frame. While the axle 21 is being oscillated slightly, piston 27 will be oscillated a comparative degree within its cylinder 25 and thus fluid in either one of the compression chambers 40 or 41 will have slight pressure exerted thereupon. This fluid pressure is not sufficient to move valves 49 and 51 from their seats to establish pressure relieving flows and thus, with an ordinary two way shock absorber, the axle 21 and frame 20 would literally be tied together thereby causing all of the shocks upon the axle to be transmitted to the frame. The present shock absorber piston, however, is free to move under these conditions, due to the fact that fluid having pressure exerted thereupon in the spring compression control chamber 40 in response to these slight compression movements of springs 22, will flow through duct 43, passage 83 into the chamber containing valve 75, thence through passage 82, annular groove 73 through the space provided by the groove 69 of the valve 64 thence into annular groove 72 of the sleeve, through passage 84, duct 44 into the spring rebound control chamber 41. The piston 27 of the shock absorber will be substantially unresisted or restrained due to the fact that practically no restriction is offered to the flow of fluid through the aforedescribed path between the compression chambers. As springs 22 rebound, the piston will be moved to exert pressure upon the fluid in the spring rebound control chamber 41, and as long as the oscillations of the body are below a predetermined value, due to the vehicle being operated over a comparatively smooth road, fluid may flow from this chamber 41 through the aforedescribed path past valve 64 into the chamber 40, in a reverse direction however. This arrangement of fluid passages provides for free action of the piston and springs 22 under these road conditions.

When the vehicle is being operated over a comparatively rough highway and especially at high speeds, it is inadvisable to permit free action of the shock absorber as aforedescribed. For this reason applicants have provided the inertia weight controlled valve 64 which, while the shock absorber casing is being oscillated extensively due to the rough highway, will tend to remain immovable or substantially so, thereby causing relative movement between the valve 64 and the valve sleeve 63.

If, for instance, the road conditions cause the vehicle body to move upwardly, beyond a predetermined value of acceleration, the weight 68, tending to remain motionless, will cause valve portion 70 to shut off communication between the annular groove 72 of the valve sleeve 63 and the space provided by the valve groove 69. As the body carrying frame 20 moves upwardly, the piston 28 will move toward the right, (Fig. 2), exerting pressure upon the fluid within the spring rebound control chamber 41, to urge said fluid through the duct 44 and passage 84. The annular groove 72 being closed and the chamber containing valve 86 being closed by said valve, no fluid can, under these circumstances, flow through passage 84 toward the passage 83, and thus the only escape for fluid pressure in the chamber 41 is through duct 44 past the valve 51. This valve is movable from its seat to establish fluid connections between chambers 41 and 40, when a predetermined fluid pressure is attained within the chamber 41. The valve 51 restricts the flow of fluid so that the movement of the piston 27 toward the right as regards Fig. 2 will be resisted and consequently the upward movement of the body is restrained.

On the other hand if the vehicle body carrying frame 20 is being moved downwardly beyond a predetermined value of acceleration, the piston 27 is moved toward the left. Weight element 68 tending to holding its valve 64 immovable will cause the valve portion 71 to close annular groove 73 and, consequently fluid under pressure from the spring compression control chamber 40 cannot flow through the duct or passage 83, valve chamber containing valve 75 and passage 82 through annular groove 73 into the spaced provided by the valve groove 69. This passage being closed, fluid may flow from chamber 40 through duct 43 after valve 49 has been moved from its seat by a proper fluid pressure, thus establishing communication with the opposite compression chamber 41 and thereby providing a restricted flow between chambers 40 and 41 which will resist the movement of piston 27 toward the left and consequently restrain the downward movement of the body carrying frame 20.

As shown in Figs. 2 and 3, the inertia weight controlled fluid flow device is provided with passages 78 and 89 having ball check valves 75 and 86 respectively, which function as follows;

Supposing the vehicle body carrying frame 20 is moved upwardly, and, due to this upward movement, the weight element 68 has caused portion 70 of its valve 64 to cover the annular groove 72, now, for instance, if the vehicle wheels, not shown should strike an obstruction in the roadway causing sudden compression of the springs 22, piston 27 would be moved toward the left as regards Fig. 2 and fluid within the spring compression control chamber 40 will have pressure exerted thereupon, urging it through the duct 43. If the fluid pressure is not sufficient to move valve 49, and if passage 89 and its valve 86 were not provided, then the fluid pressure could not be relieved through duct 83 past the valve 64 into the duct 84 due to the fact that groove 72 is closed, and consequently the shock absorber would act as a rigid connection between the axle and the body carrying frame 20 until valve 49 would be moved to establish a pressure relieving flow. The striking of the obstruction by the wheels would add an impetus to the upward movement of said frame, resulting in uncomfortable oscillation of the frame 20 upon which the body of the vehicle is supported. However, by the provision of passage 89 and its ball check valve 86, fluid may flow from passage 83 through the chamber containing valve 75, passage 82 into the annular groove 73, thence through the space provided by the groove 69 in the valve 64 and passage 89, moving the valve 86 from its seat and entering the valve chamber containing said valve 86 and thence flowing through passage 85 and 84, duct 44 into the chamber 41 and thereby rendering the shock absorber substantially free. The springs 21 may thus move freely and thereby the force tending to add to the upward movement of the body carrying frame 20 is substantially dissipated.

Valve 75 acts reversely. If the road wheels, not shown, should meet a rut or hole in the highway they would drop into it, causing the springs 22 to move on their rebound stroke and thus cause the piston to move toward the right, exerting a pressure upon the fluid in the spring rebound chamber 41. The downward movement of the body carrying frame 20 will cause valve portion 71 to close annular groove 73 of the valve-sleeve. Fluid pressure in the chamber 41 will force the fluid through duct 44, passage 84 into the annular groove 72, thence around the valve space provided by the groove 69 through passage 78, moving valve 75 from its seat and continuing through passage 83 and duct 43 to the opposite chamber 40 of the shock absorber. This permits the spring 22 to move freely and prevent a rigid connection between the axle 21 and the body carrying frame 20, which would result if no passage 78 and its valve 75 were provided, said rigid connection continuing until the pressure release valve 51 would operate to establish a flow of fluid.

It will be observed that applicants' valve 64 is so constructed and arranged that it will not be affected by fluid pressure. All of the passages about said valve are annular and thence the fluid pressure against the valve is equally distributed on all sides.

Applicants in the present invention have provided a shock absorber adapted, automatically to adjust itself to road conditions so that the fluid flow in the shock absorber which provides resistance to piston movements is regulated in accordance with road conditions over which the vehicle is being operated.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a cylinder; a piston in said cylinder forming a compression chamber at each end thereof; valve chambers; a duct leading from each compression chamber respectively, each duct having branch portions communicating with the respective valve chambers; pressure release valves in two of the valve chambers, each valve normally cutting off communication between the branches of the two ducts leading thereinto; and a control valve in the other valve chamber normally establishing an unrestricted flow between the branches of the ducts leading into said chamber but adapted to restrict said flow in response to predetermined oscillations of the shock absorber casing.

2. A shock absorber comprising, in combination, a casing providing a cylinder; a piston in the cylinder forming a compression chamber at each end thereof; two valve-chambers provided by the casing; a duct leading from each compression chamber and terminating in a respective valve-chamber; a spring-loaded valve in each valve-chamber normally cutting off communication between said chamber and the respective duct leading to it; passages providing communication between each valve chamber and the duct leading to the other valve-chamber; a third valve-chamber provided by the casing; passages leading from the respective ducts into said third valve-chamber ;a spring suspended control-valve in said third valve-chamber normally maintaining communication between the passages leading thereinto; and a weight element attached to said control-valve and adapted to operate said valve in response to oscillations of the shock absorber casing for controlling the flow of fluid in response to the action of the piston in said casing.

3. A shock absorber comprising, in combination, a casing providing a cylinder; a piston forming a compression chamber at each end of the cylinder; ducts in the casing connecting said compression chamber; a valve normally closing each duct but adapted to establish pressure relieving flows of fluid through said ducts between the compression chambers; a valve-chamber having communication with both compression chambers; a valve in said chamber normally permitting a substantially unrestricted flow through said chambers, and an inertia weight element attached to said valve and adapted to operate the valve to restrict the flow of fluid through its valve chamber in response to predetermined oscillation of the casing, said weight element being adapted to operate the valve entirely to shut off the fluid flow through its chamber and thereby cause the fluid to flow through said ducts and open the valve therein in response to more extensive oscillations of the casing.

4. A shock absorber comprising, in combination, a casing providing a cylinder; a piston in said cylinder forming a compressed chamber at each end thereof; interconnected ducts providing communication between said compression chambers; oppositely acting pressure release valves controlling the flow of fluid in either direction through said ducts; and an inertia weight controlled valve adapted, during predetermined oscillations of the shock absorber casing, to establish a flow of fluid between the compression chambers and around the pressure release valves, said inertia weight controlled valve being adapted, however, to shut off its flow of fluid entirely and cause the fluid to flow through the pressure release valves during oscillations of the casing exceeding said predetermined oscillations.

5. A shock absorber comprising, in combination, a casing providing a cylinder; a piston in said cylinder forming two compression chambers therein; ducts in the casing, provided with valves adapted, in response to pressure, to establish pressure relieving flows of fluid through said ducts between the compression chambers; passages connecting the ducts with a valve chamber and adapted to shunt the fluid flow by their valves and through said valve chamber; and a valve in said valve chamber for controlling the flow of fluid through said passages and valve chamber in response to the oscillation of the shock absorber casing only.

6. A shock absorber comprising, in combination, a casing providing a cylinder; a piston in said cylinder forming a compression chamber at each end thereof; interconnected ducts providing communication between said chambers; valves in said ducts adapted, in response to fluid pressure, to control the flow of fluid between said chambers in either direction; a passage providing for the flow of fluid around said valves; an inertia weight controlled valve in said passage normally maintaining said passage open but adapted, at predetermined oscillations of the shock absorber casing, to close said passage and direct all fluid flow through the aforementioned ducts, and check valves in said passage cooperating with the inertia weight controlled valve for re-establishing the flow of fluid through said passage in response to fluid pressure in the compression chambers and while the inertia weight controlled valve closes the said passage.

7. An hydraulic shock absorber, comprising, in combination, a casing providing a cylinder in which a reciprocative piston forms two compression chambers; ducts connecting said chambers; a valve in each duct adapted to relieve pressure therein; a passage connected with each duct and adapted to shunt fluid flow around the valve in the respective duct; and an inertia mass controlled valve adapted to regulate the fluid flow through said passages and thus regulate the fluid pressure directed against said pressure release valves in accordance with accelerations in the vertical movements of the casing.

8. A shock absorber for absorbing energy, comprising, in combination, a fluid containing chamber of variable volume, means through which fluid is admitted into said chamber, a conduit having branch passages through which the fluid flows when leaving said chamber, inertia means for closing one passage of the conduit to resist the flow of fluid therethrough, and resilient means at all times adapted to open the other branch of the conduit to establish a flow of fluid therethrough in response to an excessive pressure in said chamber.

9. An hydraulic shock absorber having a fluid displacement chamber provided with an outlet; means adapted to urge fluid from said chamber; an inertia valve adapted to be moved out of normal position in one direction or the other, in response to accelerations in the upward or downward movement of the shock absorber to restrict fluid flow from said outlet; and a spring loaded valve adapted to be moved by fluid pressure to establish a flow of fluid from said outlet, regardless of the position of the inertia valve.

10. An hydraulic shock absorber having a fluid displacement chamber provided with an outlet; said outlet having branch passages; means adapted to urge fluid from said chamber through the outlet and its passages; and fluid flow controlling means in each passage, the one maintaining its passage normally open but adapted to restrict the fluid flow therethrough in response to accelerations in the vertical movements of the shock absorber, the other controlling means normally closing its passage but adapted to establish a flow therethrough in response to fluid pressure and regardless of the position of the control means in the other passage.

11. An hydraulic shock absorber comprising in combination, a casing providing a cylinder in which a reciprocative piston forms two fluid displacement chambers; ducts connecting said chambers; an inertia valve adapted to restrict fluid flow through certain of said ducts in response to accelerations in the vertical movements of the casing; and spring-loaded valves adapted to be moved by fluid pressure to establish fluid flow through other of said ducts and regardless of the position of the inertia valve.

12. An hydraulic shock absorber comprising in combination, a casing providing a cylinder in which a reciprocative piston forms two fluid displacement chambers; ducts connecting said chambers; an inertia valve normally maintaining certain of said ducts open; but adapted to be actuated in response to accelerations in the movements of the casing vertically to restrict fluid flow through said ducts; and oppositely acting pressure release valves normally maintaining certain other of said ducts closed, but adapted to be actuated by an excessive pressure in respective displacement chambers to establish a flow of fluid therefrom and regardless of the position of the inertia valve.

13. An hydraulic shock absorber having two fluid displacement chambers each provided with an outlet; inertia means adapted to be actuated to restrict the flow of fluid from either outlet; and a plurality of spring-loaded valves adapted to regulate fluid flow from said outlets, certain of said valves being movable by fluid pressure only when the inertia means is in fluid flow restricting positions.

14. An hydraulic shock absorber having two fluid displacement chambers each provided with an outlet; an inertia mass actuated valve adapted to restrict fluid flow from either outlet in accordance with accelerations in the vertical movements of the shock absorber; normally closed pressure release valves adapted to be actuated to establish fluid flows from the respective outlets, certain of said valves being effective to establish flows only when the inertia mass actuated valve stops fluid flow.

15. An hydraulic shock absorber having two fluid displacement chambers each provided with an outlet; ducts connecting said outlets; an inertia mass actuated valve normally maintaining certain of said ducts open but adapted to restrict fluid flow therethrough in response to accelerations in the vertical movements of the shock absorber; check valves for relieving fluid pressure upon the inertia mass actuated valve when it is in extreme fluid flow restricting positions respectively; and pressure release valves in certain other of said ducts for controlling the fluid flow therethrough in accordance with fluid pressure.

16. An hydraulic shock absorber having two fluid displacement chambers each provided with an outlet; ducts connecting said outlets; a control valve provided with an inertia mass and resiliently supported normally to maintain one of said ducts open but adapted to be actuated from normal position in one direction or the other, in response to accelerations in the upward or downward movement of the shock absorber, to restrict fluid flow through said duct; spring-loaded check valves adapted to relieve fluid pressure upon the control valve when it is in either one of its extreme positions from normal; and spring-loaded pressure release valves in certain other of said ducts.

17. An hydraulic shock absorber having two fluid displacement chambers each provided with an outlet having branch passages, the corresponding passage of each outlet being interconnected; an inertia mass controlled valve adapted to restrict the fluid flow through one set of the branch passages in response to accelerations in the upward or downward movements of the shock absorber; check valves in said set of branch passages adapted to establish fluid flows around said valve when it is in one or the other of its extreme positions from normal; and oppositely acting pressure release valves in the other branch passages of the outlets.

CARL H. KINDL.
FREDERICK D. FUNSTON.